W. H. HILLENBRAND.
ACETYLENE GENERATOR.
APPLICATION FILED JAN. 26, 1918.

1,283,767.

Patented Nov. 5, 1918.
3 SHEETS—SHEET 1.

Inventor
William H. Hillenbrand,

By
Attorney

W. H. HILLENBRAND.
ACETYLENE GENERATOR.
APPLICATION FILED JAN. 26, 1918.

1,283,767.

Patented Nov. 5, 1918.
3 SHEETS—SHEET 3.

Inventor
William H. Hillenbrand,
By C. Hume Talbert
Attorney

UNITED STATES PATENT OFFICE.

WILLIAM H. HILLENBRAND, OF RICHMOND, VIRGINIA.

ACETYLENE-GENERATOR.

1,283,767.   Specification of Letters Patent.   Patented Nov. 5, 1918.

Application filed January 26, 1918. Serial No. 213,950.

*To all whom it may concern:*

Be it known that I, WILLIAM H. HILLENBRAND, a citizen of the United States of America, residing at Richmond, in the county of Henrico and State of Virginia, have invented new and useful Improvements in Acetylene-Generators, of which the following is a specification.

The invention has general reference to gas generating appliances but is particularly an acetylene gas generator.

Its principal object is to combine in one unit a gas generating and gas storage tank with means for automatically generating new gas to take the place of that used.

The invention comprises a main tank adapted to hold water in its bottom to a prescribed height, the tank having provision for a water seal near the upper end and having also a gasometer bell which engages in the water seal. The tank carries near its upper end and below this gasometer bell a carbid holder having a valve which is automatically opened when the gasometer bell, in descending to its lowest point, comes into contact with certain mechanism, thereby liberating a specified amount of carbid which, falling into the water contained in the main tank, results in the generation of gas which rises to the top of the tank and raises the gasometer bell, thereby releasing the flow of carbid into the water until such time as a sufficient amount of gas has been used to permit the gasometer bell to again drop and to again operate the carbid valve.

A further object of the invention is to provide a device of this character which is simple in construction, durable and effective in operation and which may be manufactured at small cost.

A still further object of the invention is to provide means in a device of this character whereby the user will be forewarned of the final consumption of the carbid used for the gas generating purposes.

Other and further objects will be made apparent as the detail description of the invention follows.

To the exact construction in which it is shown and described, the invention is not to be confined. Its actual practical application may show certain changes or alterations to be of advantage and the right is claimed to make any which do not deviate from the scope of the subjoined claims.

The same numerals of reference designate the same parts throughout the several figures of the drawings, wherein.

Figure 1:
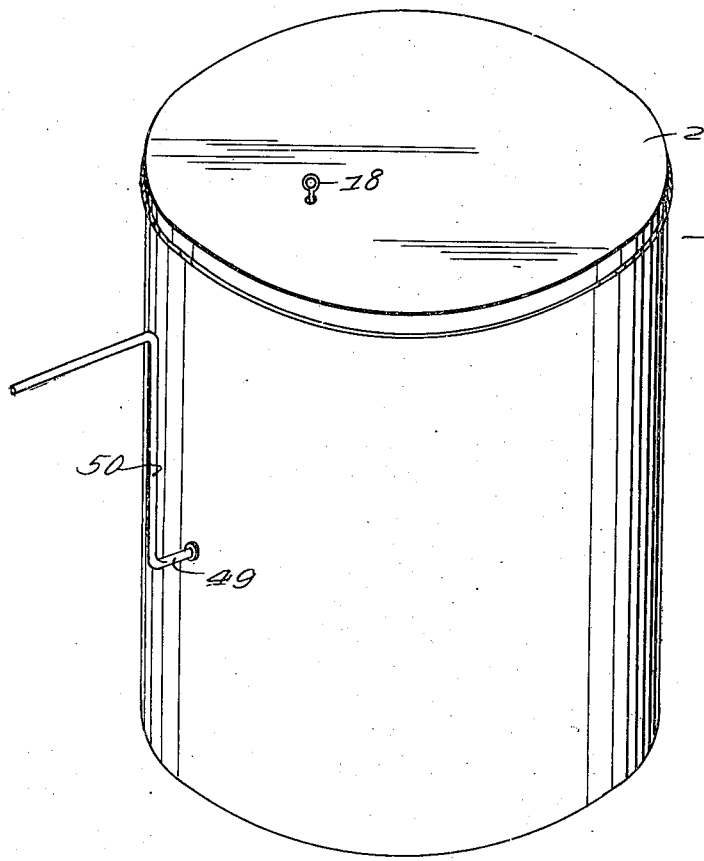
Figure 1 is a perspective view of the generator.
Figure 6:
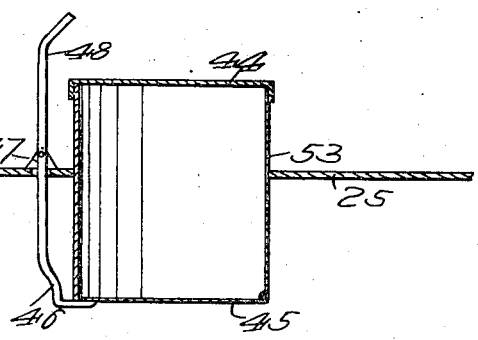
Fig. 6 is another enlarged detail view of the latch for the auxiliary carbid holder.
Figure 2:
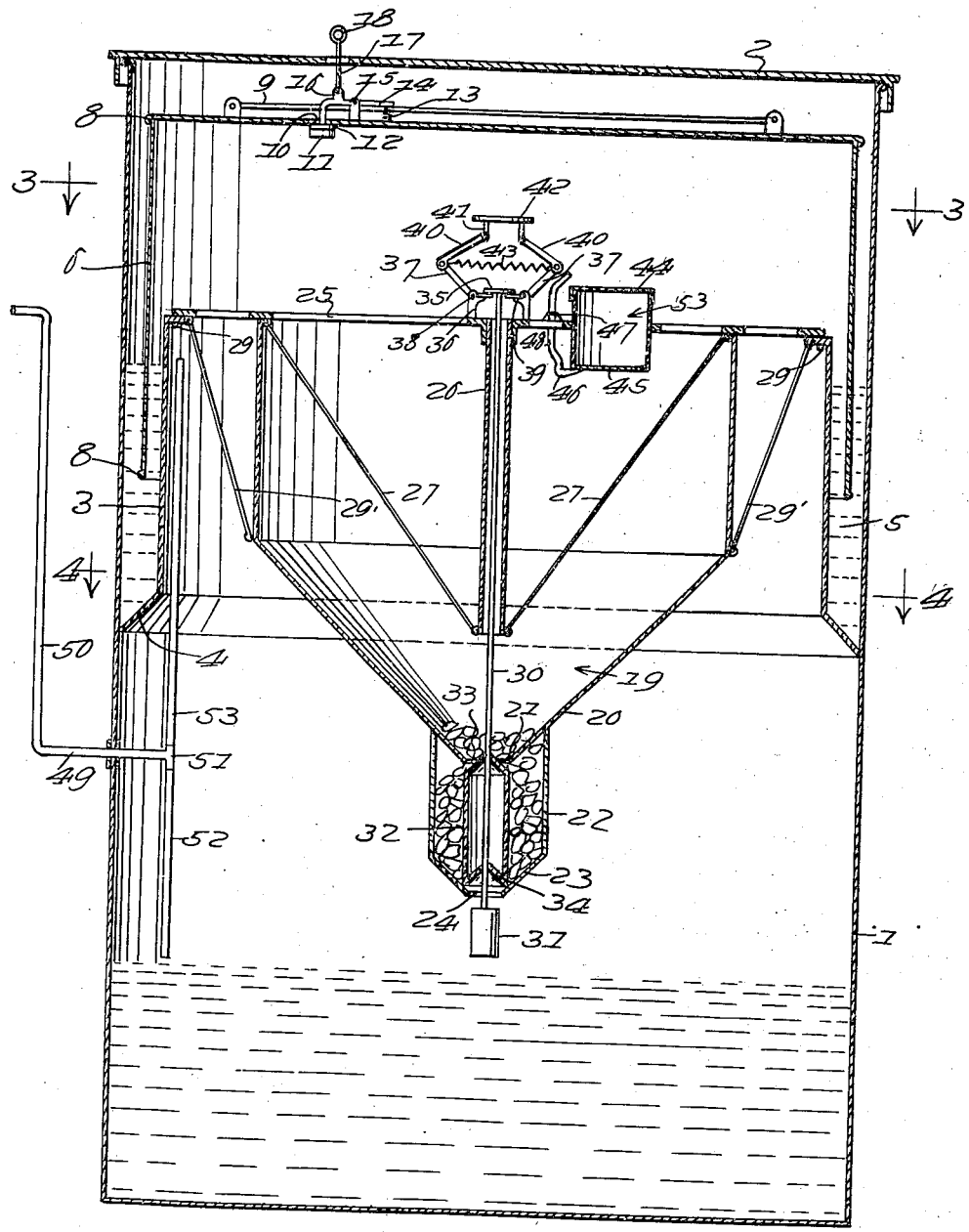
Fig. 2 is a central vertical sectional view.
Figure 3:
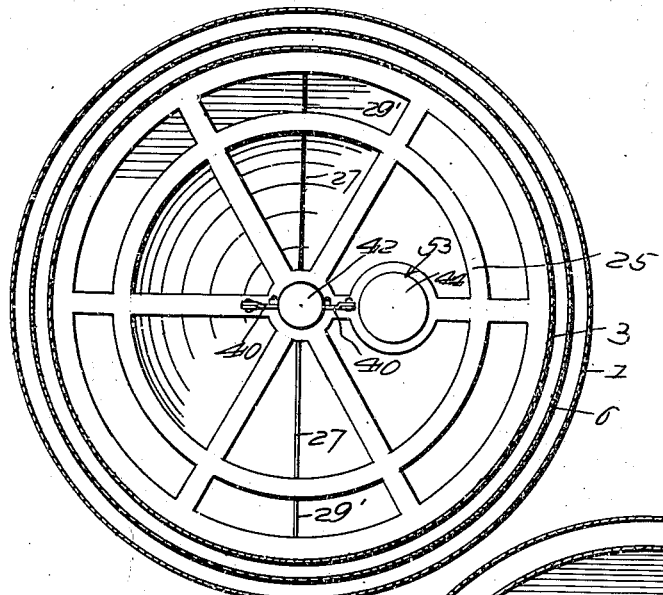
Fig. 3 is a section on the line 3—3 of Fig. 2.
Figure 4:
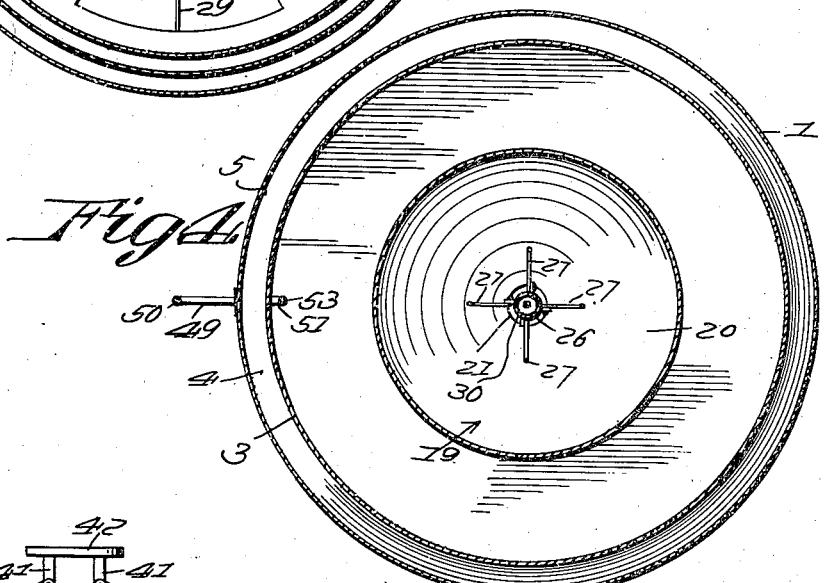
Fig. 4 is a section on the line 4—4 of Fig. 2.
Figure 5:
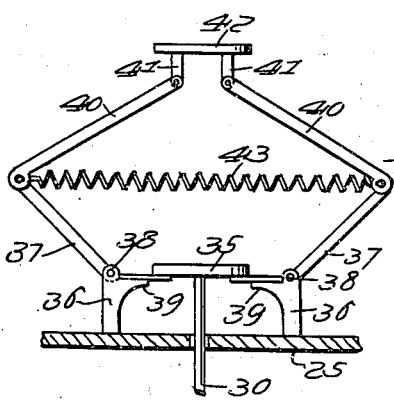
Fig. 5 is an enlarged detail view of the mechanism for operating the valve of the carbid holder.

Referring to the drawings, there is shown a cylindrical tank 1 permanently closed at its bottom end and provided at its upper open end with a cover member 2. Approximately at its vertical middle, the tank carries on its interior a cylindrical member 3 open at both ends, the bottom end, however, being provided with a diagonally disposed circumferential flange 4 which engages the inner cylindrical surface of the tank 1. The space 5 comprehended between the cylindrical member 3 and the cylindrical walls of the tank 1 is designed to be filled with water in which the lower edges of the open end of the gasometer bell 6 are immersed, the latter being in the form of a cylinder closed at its upper end. The gasometer bell 6 is carried within the tank 1 and is adapted for vertical movement therein, its lower edges, however, being always in contact with the water seal carried in the space 5. As a means for strengthening the gasometer bell, annular ribs 8 are attached on its bottom end and at the point of juncture between the top 7 and the cylindrical sides of the bell. A handle 9 is swingingly attached on the upper face of the cover 7 of the gasometer bell and is intended as means for lifting the latter out of the tank 1 when it is so desired.

A port or opening 10 is provided in the top 7 and this port is normally closed by a valve member 11 which is carried below the top and which has affixed to it a suitable washer 12 that is interposed between the valve and the top and serves to make the opening 10 air tight when the washer is held against the top by the valve, in which position the two latter are normally held by the spring 13. This spring 13 connects between the free end of the lever 14 and the upper face of the top 7 and serves to draw this free end of the lever 14 toward the upper face of the top, the former being pivotally mounted between the ears 15 attached to the top and passing down through the opening 10 to connect with the valve 11 of which it is a part, the lever 14 where it passes through the opening being much smaller than the latter. An integral ear 16 is formed on the lever 14 between the point where it connects with the valve and its pivotal connection with the ears 15 and this ear has loosely attached to it a rod member 17 that passes loosely through an appropriate hole formed in the cover 2 on the outside of which the rod has an eye 18 formed in it for engagement by the fingers.

Interior to the tank 1 and contained in the latter below the gasometer bell, there is a carbid holder 19 whose bottom 20 is made conical in shape, the body portion of the holder being cylindrical in shape and of much smaller diameter than the diameter of the cylindrical member 3. The conical bottom 20 is provided with the port or opening 21 at its apex and in surrounding relation to this port and depending from the center of the bottom, there is a cylindrical member 22 having a conical bottom 23 with the port or opening 24 at its apex, this port opening into the tank 1. At the upper end of the carbid holder 20 which upper end is open, there is a spider plate 25 at whose center a tubular member 26 is affixed, the latter extending down into the carbid holder 19 and having guy rods 27 attached at its ends which guy rods extend diagonally upward and effect attachment with the arms of the spider plate. The plate and the guy rods thus serve to support the tube 26 in a perpendicular depending position. The arms of the spider plate 25 extend radially beyond the cylindrical sides of the holder 19 and have hook members 29 formed on their free ends, which hook members hang from the upper circular edge of the member 9 and thus serve to support the carbid holder within the tank 1. To strengthen the arms of the spider plate where they extend beyond the carbid holder 19, brace members 29 are attached which are secured one end to the arms of the spider plates adjacent the points where the hook members 28 are formed and the other end to the body portion of the carbid holder near the points where the conical bottom 20 adjoins the latter.

The spider plate 25 has an opening at its center registering with the tube 26 that is attached to the plate and through this opening and through the tube a stem 30 slidably passes, the stem extending down through the port 21 in the carbid holder and through the port 24 in the cylindrical member 22, receiving at its bottom end a weight 31. The stem carries within the cylindrical member 22 a cylindrical valve member 32 which is in surrounding relation to the stem and whose upper end 33 is conical convex and whose lower end is conical concave. The stem 30 extends above the spider plate 25 and has a circular head 35 formed on its upper end. On diametrically opposite sides of the stem 30 but in close proximity to it, the spider plate 25 has attached to it the standards 36 which are slotted on their upper ends and receive in these slots the bell crank levers 37 which are pivotally mounted on the pins 38. The shorter arms of the bell crank levers extend underneath the head 35 of the stem 30, and the normal positions of these shorter arms is limited to the horizontal line by shoulder members 39 which are formed integral with the supports 36. The longer legs of the bell crank levers 37 are pivotally connected at their ends with one end of the links 40, the remaining ends of the two links 40 effecting pivotal connection with the legs 41 which depend from the lower face of the plate 42. The plate 42, and its attendant parts, the links 40 and the bell crank levers 37 are thus arranged in the form of a toggle joint and the spiral spring 43 is attached between each pair of links 40 and bell crank levers 37, being attached to each pair at the pivotal connections between the links and the levers. This spring serves normally to hold the shorter arms of the bell crank levers against the abutment members 39 but when the plate 42 is depressed this spring 43 is stretched and the shorter arms of the bell crank levers are raised, engaging below the head 35 of the stem 30 raising the latter.

Carried in one of the arms of the spider plate 25, there is an auxiliary carbid holder 53 which is cylindrical in shape and which is so attached to its attendant leg of the spider plate that half of the holder extends below the plate and the other half above. The upper end of the auxiliary holder 53 is closed by a suitable cover member 44 while the lower end is closed by a hingedly mounted door 45, this door being held normally in the position of closure by means of the L-shaped latch 46 whose shorter leg stands underneath the door to hold it in the position of closure. The L-shaped latch 46 extends upwardly through the spider plate 25 being pivotally mounted between ears 47 formed on the upper face of the spider plate. The opening in the spider plate through which the L-shaped latch passes is of such dimensions as to permit the free movement of the latch when the latter operates. The longer leg of the latch terminates in an inclined portion 48 which stands normally below the longer leg adjacent the bell crank lever 37 with which the leg itself is brought into contact to operate the latch under certain conditions.

A nipple 49 passes through the cylindrical wall of the tank 1 at a point slightly below where the cylindrical member 3 is attached to the latter, this nipple having a gas tight joint where it passes through the tank. Outside of the tank it is designed to receive the end of the supply pipe 50 while interior to the tank it is provided with a T 51 whose cross leg stands vertical, the lower end of the cross leg receiving a pipe 52 which projects downwardly into the tank and the upper end of the cross leg having attached to it a pipe 53 which rises upwardly and terminates at a point just below the upper end of the cylindrical member 3.

In putting the generator into operation the cover 2 is removed from the tank 1 after which the gasometer is lifted out by means of its handle 9. The carbid holder and all its attendant parts may then be disengaged from the cylindrical member 3, thus leaving the tank 1 practically empty. The tank is then supplied with water up to the level of the lower end of the pipe 52 after which the carbid holder is replaced. The valve 32 of this holder is, at this time, raising in the lower end of the cylindrical member 3, its conical convex portion closing the port 24 of the latter. The holder is then supplied with carbid to the extent of its capacity and the auxiliary holder 53 also supplied with its full capacity of carbid. The gasometer bell is then placed in position but in so doing it admits a certain amount of air that prevents its descending. The cover member 2 is then placed in position, the rod 17 being allowed to pass through the hole prepared for it in the latter. To release the air which was trapped underneath the gasometer bell, the rod 17 is depressed by means of its eye or loop 18 which operation unseats the valve 11 and permits the trapped air to pass out from the gasometer bell through the port 10. The bell then settles by its own weight until its top contacts with the plate 42 which operation causes the bell crank levers 37 to engage the head 36 of the stem 30, causing the latter to raise the valve 32 from the port 24. The carbid which had been placed in the holder 19 and which had passed from the port 21 to the bottom of the cylindrical member 22, then drops through the port 24 into the water in the bottom of the tank 1, in the presence of which it begins the generation of gas which rises to the top of the tank and passes between the arms of the spider plate 25 and fills the gasometer bell, raising the latter until its top plate 7 no longer contacts with the plate 42 whereupon the spring 53 returns the bell crank levers to their normal positions, thus permitting the valve 32 to drop back and close the port 24.

As the gas is used from the supply pipe 50 and its volume reduced by the continued consumption, the gasometer bell again settles on top of the plate 42, releasing the carbid as before and permitting the generation of additional gas. By means of the water in the space 5 in the cylindrical member 3 and the cylindrical walls of the tank 1, the gas is prevented from escaping when passing from the tank to the gasometer bell, or when the latter is raising or lowering.

After these continued operations have resulted in exhausting the supply of carbid contained in the holder 19, the gasometer bell continues to settle, depressing the plate 42 a farther distance than it was depressed by previous movement of the bell. This increased depressing movement imparted to the plate 42 brings the handle arm of one of the bell crank levers 37 into contact with the inclined portion 48 of the L-shaped latch 46, rocking the latter on its pivotal connection with the spider plate and serving to release the shorter leg from engagement with the bottom door 45 of the auxiliary carbid holder 53. This operation permits the carbid which was contained in the holder 53 to drop into the holder 19 but it is precluded from passing from the latter because of the extended depression of the plate 42 with the resultant greater movement of the levers 37 which operate through the stem 30 to raise the valve 32 high enough for its convex conical end 43 to close the port 21. The generator is incapable of generating any further gas until after the cover 2 has been removed and the gasometer bell lifted slightly by means of the handle 9 so as to release the valve 32 and permit the latter to drop upon and close the port 24. If there is any air below the gasometer bell which may have entered through the pipe 50 after the gas which was in the generator was exhausted this air may be released by means of the valve 11 by permitting the gasometer bell to settle and operate the valve 32 to admit carbid into the water as before.

The advantage of the particular arrangement for providing an auxiliary holder similar to the holder 53 makes it possible to forewarn the exhaustion of the device. For example: Let it be assumed that the holder 19 will hold 90 pounds of carbid and that the auxiliary holder 53 will hold 10 pounds. The generator is put into operation and it continues to generate gas by admitting carbid to the water in tank 1 from the holder 19 until all of the carbid in this holder 19 is used. After all the gas which was generated by this carbid with which the holder 19 was supplied has been used, no further gas is obtainable until after the gasometer bell has been operated as before described to use the 10 pounds of carbid supplied to the auxiliary holder. Thus after the first 90 pounds of carbid have been used, it is always possible to easily put the generator into operation again to use the remaining 10 pounds and when the time comes to use this 10 pounds the person employing the device knows the time for recharging has arrived.

The invention having been described, what is claimed as new and useful is:

1. In an acetylene generator, a tank, a gasometer bell movable in said tank, a water seal between the tank and the bell, a main carbid holder positioned in the tank below the gasometer bell, an auxiliary carbid holder conjoined with the main holder, the main holder having a double outlet, a valve joined with the main holder and adapted to close either unit of the double outlet, a stem for said valve, bell crank levers pivotally mounted on top of the main holder, and having means for engaging the said valve stem, links connected with the said bell crank levers, a plate pivotally connected with said links, a spring contained between the bell crank levers at their connection with the links, and means connected with the auxiliary carbid holder to permit the discharge of carbid therein, whereby the gasometer bell may operate to automatically discharge carbid from the main holder in predetermined quantities for the formation of gas and finally to effect the discharge of the carbid from the auxiliary holder into the main holder.

2. In an acetylene generator, a tank, a gasometer bell movable in said tank, a water seal between the tank and the bell, a main carbid holder positioned in the tank below the gasometer bell, said holder having a double outlet, a valve joined with the main holder and adapted to close either unit of the double outlet, a stem for said valve, bell crank levers pivotally mounted on top of the main holder and having means for engaging the said valve stem, links connected with said bell crank levers, a plate pivotally connected with said links, a spring contained between the bell crank levers at their points of connection with the links, an auxiliary carbid holder conjoined with the main holder, a hingedly mounted door at the bottom of the auxiliary carbid holder and opening into the main holder, and an L-shaped latch holding said door in the position of closure, the latch having means for having engagement by one of the aforesaid bell crank levers, whereby the gasometer bell may automatically open said valve to deposit carbid in the tank in predetermined quantities and finally to close the said valve and release the carbid from the auxiliary holder to the main holder.

In testimony whereof I affix my signature.

WILLIAM H. HILLENBRAND.